United States Patent
Ruggiero (12) 
(10) Patent No.: US 10,320,169 B1
(45) Date of Patent: Jun. 11, 2019

(54) KNEE SAVER MODULAR UNIVERSAL ELECTRICAL BOX

(71) Applicant: Alexander Ruggiero, Millsboro, DE (US)

(72) Inventor: Alexander Ruggiero, Millsboro, DE (US)

( * ) Notice: Subject to any disclaimer, the term of this patent is extended or adjusted under 35 U.S.C. 154(b) by 0 days.

(21) Appl. No.: 15/905,687

(22) Filed: Feb. 26, 2018

(51) Int. Cl.
  *H02G 3/16* (2006.01)
  *H02G 3/18* (2006.01)
  *H03J 3/00* (2006.01)
  *H02G 3/08* (2006.01)

(52) U.S. Cl.
  CPC .............. *H02G 3/16* (2013.01); *H02G 3/083* (2013.01); *H02G 3/18* (2013.01)

(58) Field of Classification Search
  CPC .. H02G 3/16; H02G 3/083; H02G 3/18; H02J 3/00; H01R 13/6395; H01R 24/525; H01R 25/006; H01R 25/161
  USPC .................................................. 174/549, 53
  See application file for complete search history.

(56) References Cited

U.S. PATENT DOCUMENTS

2017/0063061 A1*  3/2017  Moss ..................... H02J 3/00

* cited by examiner

*Primary Examiner* — Timothy J Thompson
*Assistant Examiner* — Guillermo J Egoavil (57) ABSTRACT

A method and apparatus for wiring installations that is comprised of a universal electrical box that is made of a non-conductive block or hub that contains electrical conductors, which connect power from a building's electrical power source, to various electrical components. One design, can handle nine sheathed cables in a standard box, with five #14 wire and four #12 wire lines. Once installed, the current is redirected without physically moving the wires and will power up only if the electrical component and the wires are of the same amperage. All wires including the ground wires are always visible, while electrical components are installed and operating. Individual electrical lines are identifiable, dead-ended, and with the visibility of all wires, connecting the wires is now possible before the rough inspection. The lines can be energized while the walls are open, for troubleshooting. It offers a two piece device which can be used as a receptacle, a switch, light or for fan installations, 110 or 220 line, etc., providing the necessary electrical lines are there.

8 Claims, 7 Drawing Sheets

KNEE SAVER MODULAR UNIVERSAL ELECTRICAL BOX

BACKGROUND OF THE INVENTION

1. Field of the Invention

The present invention relates to residential and commercial electrical wiring systems and the manner in which it connects wires to termination devices within the confines of a junction box, and eliminates the need for an electrician to install receptacles while on his/her knees.

The same apparatus is used for receptacles, switches, lights, timers, radios, and other electrical components, which are used with a simple unplug/plug in system.

2. Description of the Prior Art

Using the standard electrical code practices, involves in using wires to connect a power source to electrical components via junction boxes. These junction boxes are used for two primary purposes. One purpose is to have access to the circuit at different points in the building. The other purpose is to attach electrical components such as; receptacles switches, lights, or other components to the circuit. The typical junction box has six surfaces. The top, bottom, two sides, back and front, but only three useable sides for wire entry purposes.

The unusable sides include.
(1) The front, the termination device sits in the front.
(2) You cannot use the back because there is no room in a standard 2×4 wall.
(3) Then there's the one side attached to the wall stud, using a nailing flange.

That only leaves the top, bottom, and one side of the junction box for wire entry. This observation is critical when comparing prior art.

Since there are only three sides available for wire entry purposes, no significance, compared to prior art, should be made in my view, when any application with wires entering thru the top, side, or bottom are listed. The internal components and how they work are, in my view, the important factors.

While it is not necessary for a patent application to be electrical code compliant, it is necessary for someone skilled in the art to know enough electrical code to do the specific work he/she is working on.

As anyone skilled in the art knows, the national electrical code requires all wires to enter a junction box, through a punch-out opening, and exit the front of the junction box. It also dictates the wire length must be at least 4-6 inches beyond the from opening of the junction box, for the installation of a termination device.

Another requirement of the national electrical code, is that all devices must have the potential to be removed without removing or damaging the wall board. These rules are known to anyone skilled in the art. Non-adherence to these rules, make for a very short career.

U.S. Pat. No. 9,583,929 to MOSS, is a perfect example of how not to install electrical components. His wire connections are on or near the exterior walls of his junction box. His connectors are viewable outside of the junction box, therefore are exposed (and they are electrically charged). What's to stop insulation and other construction debris from entering the junction box? If his buses bend or break while changing a termination device, and are therefore not making a good connection, it must be removed, and a new one installed. First problem, the components are attached to the box. Second, he'll probably have to maneuver the very small wires connected to the set screw connectors with a long nose pliers and compromise the plastic coating on the wires.

Unfortunately, for MOSS he took the wrong path. He chose not to make a HUB or junction device, a part of his plan. He's even proud of it! He Boasts in: "(0020) Yet another feature of the pluggable electrical receptacle and universal wall box, and methods of use thereof, is the ability to avoid the use of a junction device(s) between the universal wall box and pluggable electrical receptacles, whether switch, receptacle (pin or blade style), fan switch, dimmer, decorative switch, wireless switch, occupancy sensor switch, or the like."

The present invention and MOSS's device couldn't be more different.

1. First and most important is Moss doesn't have a Hub or Junction device, as mentioned above.
2. MOSS DOESN'T have a hub, MOSS's connectors are ATTACHED to the Box, VERSES connectors in HUB. MOSS's (0028) reads: "power terminals integral to an exterior of one or more box surfaces . . . "
3. MOSS has wires just BARELY long enough to just get inside the box, VERSES much longer wires, according to code.
4. MOSS has EXPOSED (electrically charged) set screw connectors, VERSES set screws safely deep inside the hub.
5. MOSS has only one independent power line going in, and that SAME line going out, (Only one circuit breaker in the panel). The present invention could have three, with this model, and with other models, it could have more. The wires are HELD in the HUB, connected or not connected, it's up to the installer.
6. Is MOSS's device UNIVERSAL? It can work for basic switches and receptacles. However, the present invention, in addition to the basics, can handle 3 way and 4 way switches, even a split receptacle where the top half can be a 15 amp line and the bottom half a 20 amp line, at the SAME time, with different breakers in the panel box. It can be a 220 receptacle, it can be a receptacle using a #6 or #8 wire.
7. MOSS has a wireless switch and wireless device. The costs involved must be high. The method used today is to wire a switch in a box, then run that line to a receptacle. The box is $1.00, a receptacle $0.50, a cover plate $0.25, total $1.75, a lot less than a wireless system.

In U.S. Pat. No. 6,617,511 to SCHULTZ, wires go directly thru the side(rear) of box and into the hub from the wall cavity. If the wall were finished, you could not take out the hub. Any one skilled in the art would say, it will not pass inspection, therefore I can't install it. SCHULTZ has no means of disconnection the wires. Even if he did, he hasn't enough room or long enough wires to reconnect a new device.

In addition, SCHULTZ uses different embodiments for switches and receptacles, which makes it application specific.

You must get down on your knees to install his device.

U.S. Pat. No. 4,958,048 to BELL, has identical problems. In addition, like all prior art, electrical connections are made inside the hub, unlike the present invention. No prior art allows two different sized wires to be used at the same time, like the present invention. You must get down on your knees to install BELL'S device.

U.S. Pat. No. 6,843,680 to GORMAN, explains on page 13, line 21 thru 24, his device can have four #14 wires OR two #12 wires, but it becomes a permanent/non-reversible change. GORMAN does not disclose any port configuration that is universal and capable of receiving both switches and receptacles. The installation process is typical, on your knees, wire THRU the box, connections made in the front of the box, then pushed in, after pushing in the wires.

BRIEF SUMMARY

The embodiments of the invention overcome all prior art, due to its structure and method of installation, and its impact on installers, as descripted below.

A typical prior art junction box may have up to four lines going in and out of the box. In this case, that's at least (12) wires, and a pig tail that have to be attached to a receptacle and/or to other wires. The wire to wire connections are made, pushed back to—the rear of the box, and connections are made to receptacle. The receptacle is then pushed in against the existing wires in the box. At this point, you can see the wires attached to the side screws on the receptacle, and those attached wires are now bunched up in the back of the box, mingled tightly together with other wires. Of course any rear mounted wires, are totally un-viewable.

In the parent application entitled, the Universal Electrical Box, contained Permanent solid independent conductors that went from the side of the hub, to the perpendicular or front side. The conductors in this new hub design, when desired, can electrically connect or disconnect wires from the side of the hub, to the front or perpendicular side of the hub (which is the same single line).

Prior art focused on: quicker electrical connections, simpler installation processes, or labor saving installation ideas. They are applications specific and usually addresses only one of the above functions. The success rate of these modifications to prior art, have been dismal. We have been using the same receptacles and switches for fifty years. Some were against the National Electrical Code, some are just too expensive or too complicated to make.

While the parent application's main focus was installing the receptacle while standing up, we knew it wasn't enough. If it didn't save somebody money, its chances of success diminished considerably. We needed different groups of people supporting it. Therefore, we focused on four groups. Each group, in and of itself, could make this invention become a reality.

Builders & electrical contractors, electrical inspectors, electricians, and home owners were our target groups. If only one group supported us, we would be successful.

The parent application could keep the costs down on the receptacles themselves, and make a big savings on labor costs by making it possible for a highly qualified electricians to only make one trip to a work site. (The electrician would not lose money. He/she complete more work, at yet another location, in a week's time, for example). This benefits Builders and Electrical Contractors.

The electricians get the benefit of not having to get down on their knees for the installation of receptacles, and give them a chance to work longer in their field of work.

Visible of all wires and no exposed wires or screws heads make it a safer unit, which should interest the electrical inspectors.

It's simpler and a safer unit for the homeowner to install.

After speaking to electricians for feedback, we realized we could do more. The Parent application keeps the lines separate in the hub. This new application does that and now controls those lines. Those connections and disconnections are not strictly determined by the termination device anymore. It can connect and disconnect lines, and re-direct those lines, and perform other functions.

In addition, lines like the #8 and #6 wire, with the appropriate set screw, are now possible.

Most importantly, an electrician can now make all adjustments without getting down in their knees.

DETAILED DESCRIPTION OF THE DRAWINGS

Although the present invention connecting system can be embodied in many ways, the embodiments illustrated show the connecting system in its simplest embodiment for use in a single-gang junction box. These embodiments are selected in order to set forth the clearest manner to describe the invention. The illustrated embodiments, however, are merely exemplary and should not be considered a limitation when interpreting the scope of the appended claims.

Figure 1:
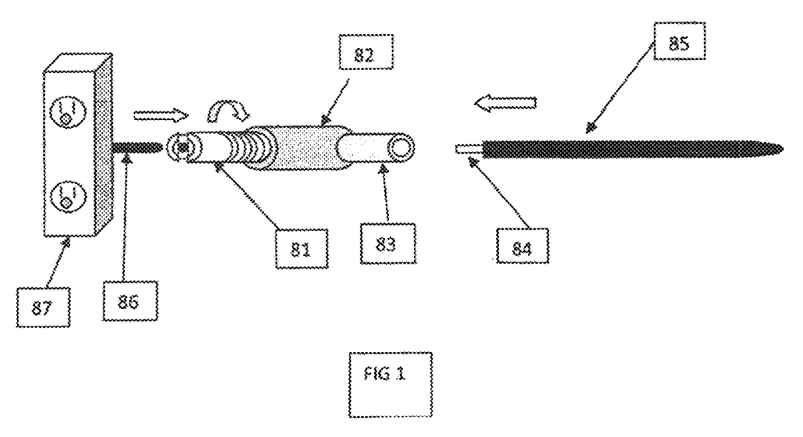
FIG. 1 HUB, SHOWING WIRE CONDUCTORS, GROUND STRIP, AND WIRING SEPARATION CHANNELS

FIG. 1. The wire coating is removed from the tip of wire (85) which expose the bare wire (84). The wire (85) is pushed into and thru opening (83) and into (82). The screw (81) is turned clockwise until it seats against the wire tip (84). The screw holds the wire in place, and makes an electrical connection between wire (85) and screw (81). This is only a continuation of the same electrical line between the side of the hub and the perpendular side of the hub. In the back side of receptacle (87) is prong (86). Prong (86) gets pushed into screw (81) making the electrical connection between the receptacle and the wires on the side of the hub, thereby powering up the receptacle from a power source thru the wire on the side of the hub.

Figure 2:
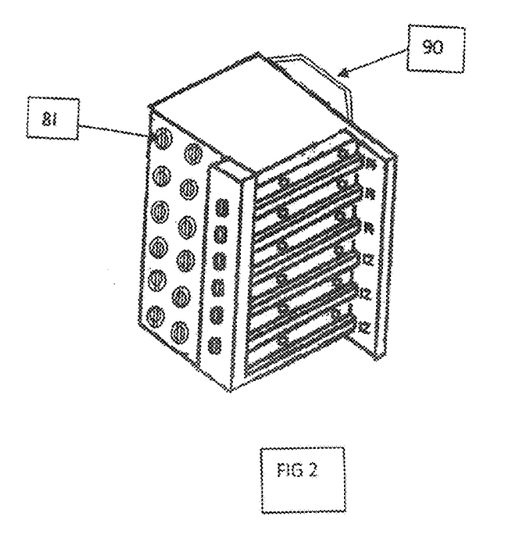
FIG. 2. SIDE VIEW SHOWING WHERE FOUR #14 WIRES AND FOUR #12 WIRES ARE PUSHED INTO THE HUB, AND GROUND SCREWS IN GROUND STRIP

FIG. 2. A drawing of the hub, containing the top flange (90), (bottom flange not shown) Also shown is a set screw (81) where a prong from a termination device get inserted in the center of the screw.

Figure 3:
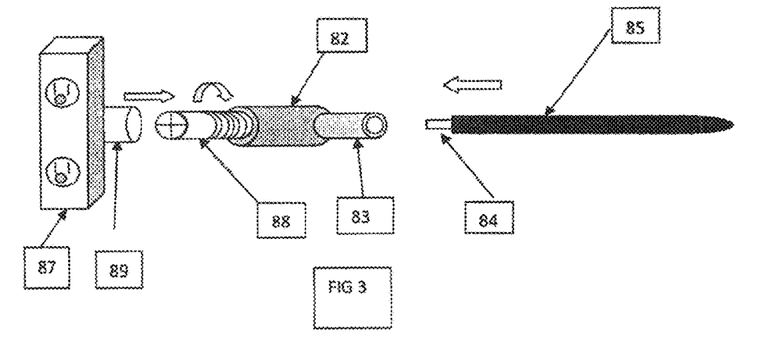
FIG. 3. SIDE, INSIDE VIEW, OPPOSITE SIDE WITH GROUNDS SCREWS
Figure 4:
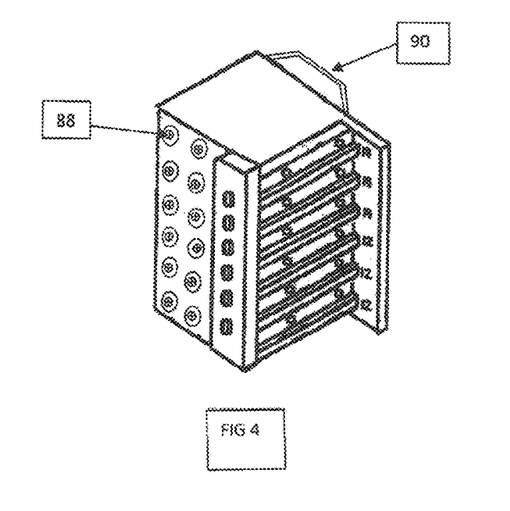
FIG. 4. INTERCHANGEABLE ELECTRICAL DEVICE, A RECEPTACLE

FIG. 3 and FIG. 4. The same as FIG. 1 and FIG. 2, except the set screw is different. A tube (89) slides over set screw (88) for electrical connection to the termination device.

Figure 5:
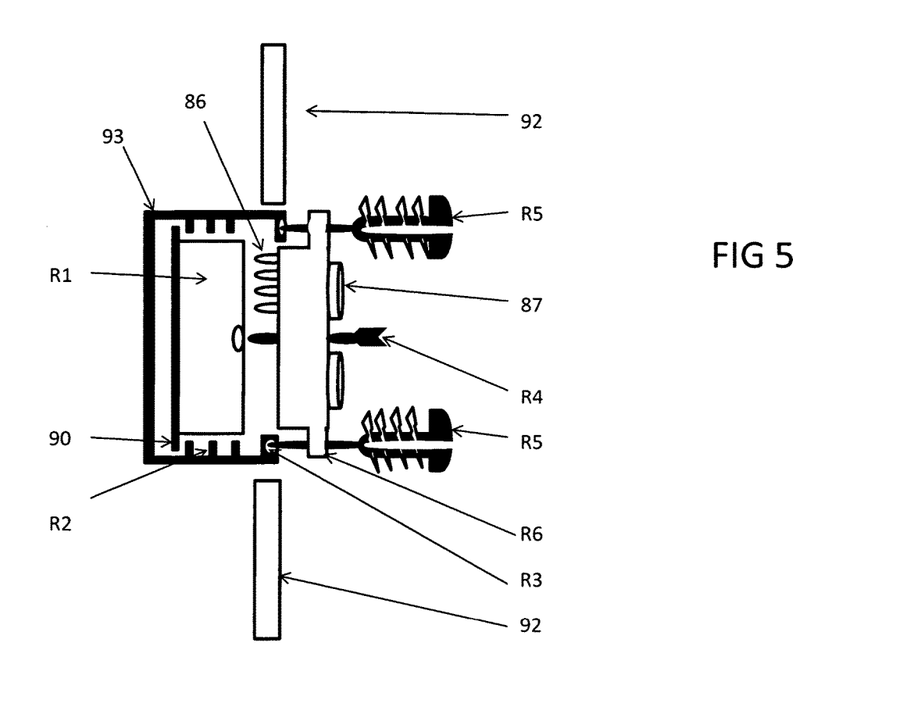
FIG. 5. INTERCHANGEABLE ELECTRICAL DEVICE, A LIGHT WITH ITS OWN SWITCH

FIG. 5. Shown is the hub positioned inside the junction box and the two options of attaching the termination device to the hub. The two split screws (R8) can go thru the receptacle and into the junction box according to the thickness of the wall covering, or the center screw (R9) can get attached to the hub, again according to the thickness of the wall covering. Note, how the hub track (R2) and the flange on the hub (90) will allow the hub, (and therefore the termination device) to move forward and line up with wall covering (92).

Figure 6:
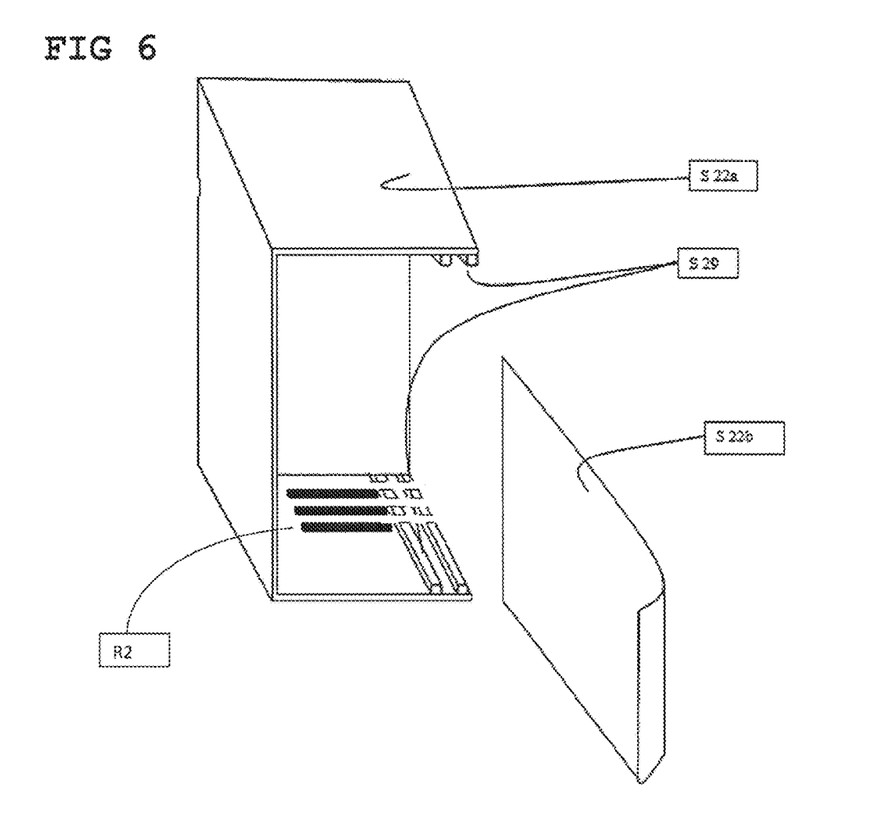
FIG. 6. INTERCHANGEABLE ELECTRICAL DEVICE, A FAN WITH ITS OWN SWITCH

FIG. 6. Has an open & side enclosure (S22a). The tracks (R2) are on the inside bottom base, and on the inside top (not Shown). The tracks are used with the flanges on the top and bottom of the hub (90), to adjust the depth of both the hub and the termination device, to be flush with a finished wall. After the hub is installed, the Removable side cover (S22b) is slid into the box using the tracks (S29)

Figure 7:
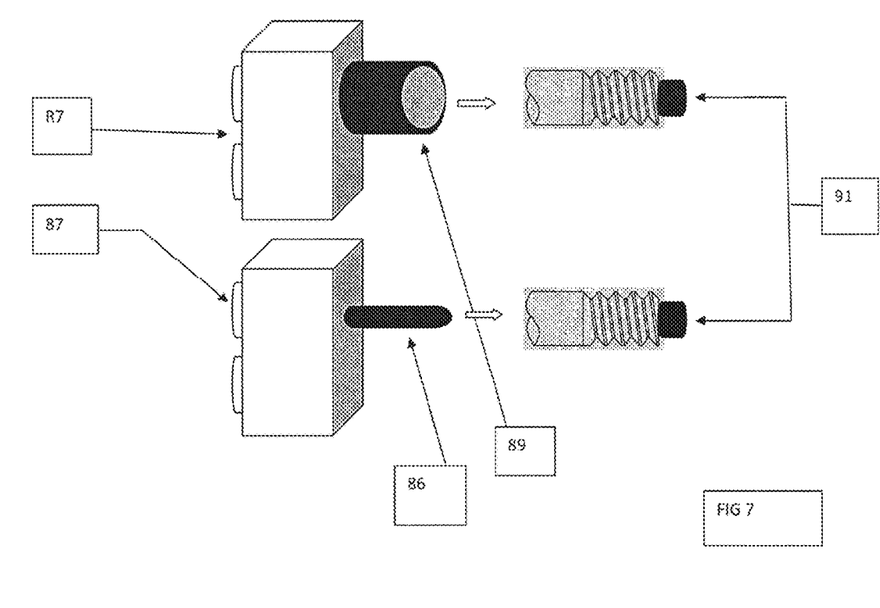
FIG. 7. INTERCHANGEABLE ELECTRICAL DEVICE, A RADIO WITH ITS OWN SWITCH

FIG. 7. Contains two receptacle termination devices (R7a, & R7b). Receptacle (R7a) has a prong (89) (tube shape) that goes over (part of) the set screw to make an electrical connection. Receptacle (R7b) has a prong (86) that gets inserted into the center of the set screw. Set screws (91) have a rubber tip to hold wires in place, but do not make an electrical connection.

Figure 8:
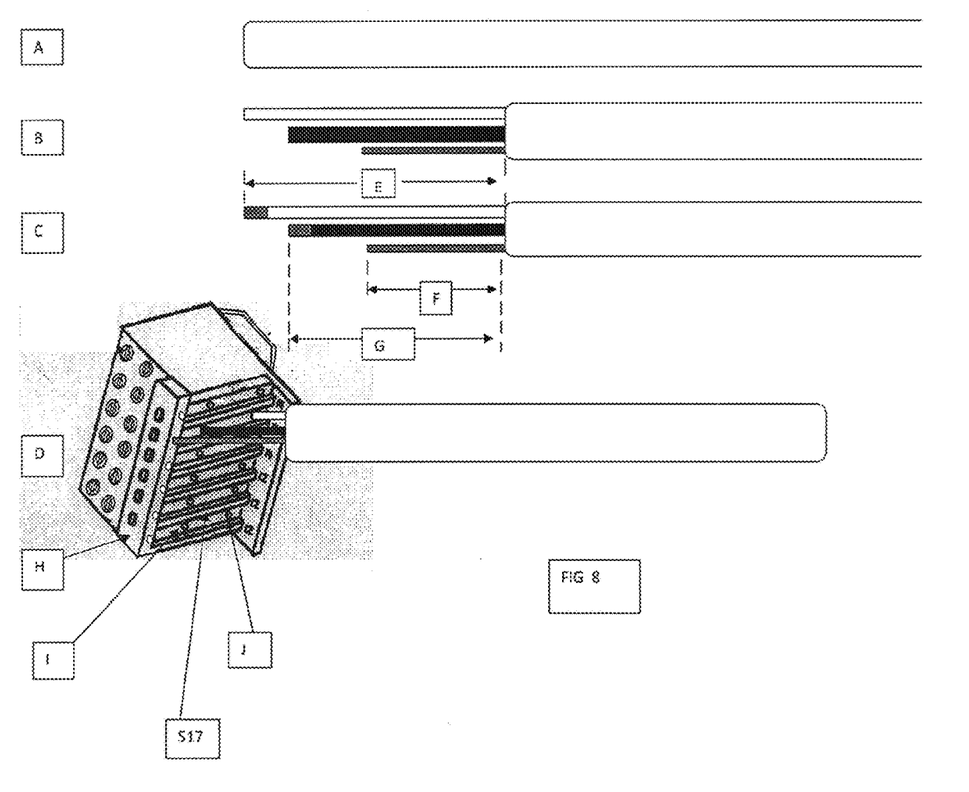
FIG. 8. RECEPTACLE, HARD WIRED TO HUB

FIG. 8. FIG. 8 contains: (A) an untouched sheathing containing wires Length (E, F, G)

Figure 9:
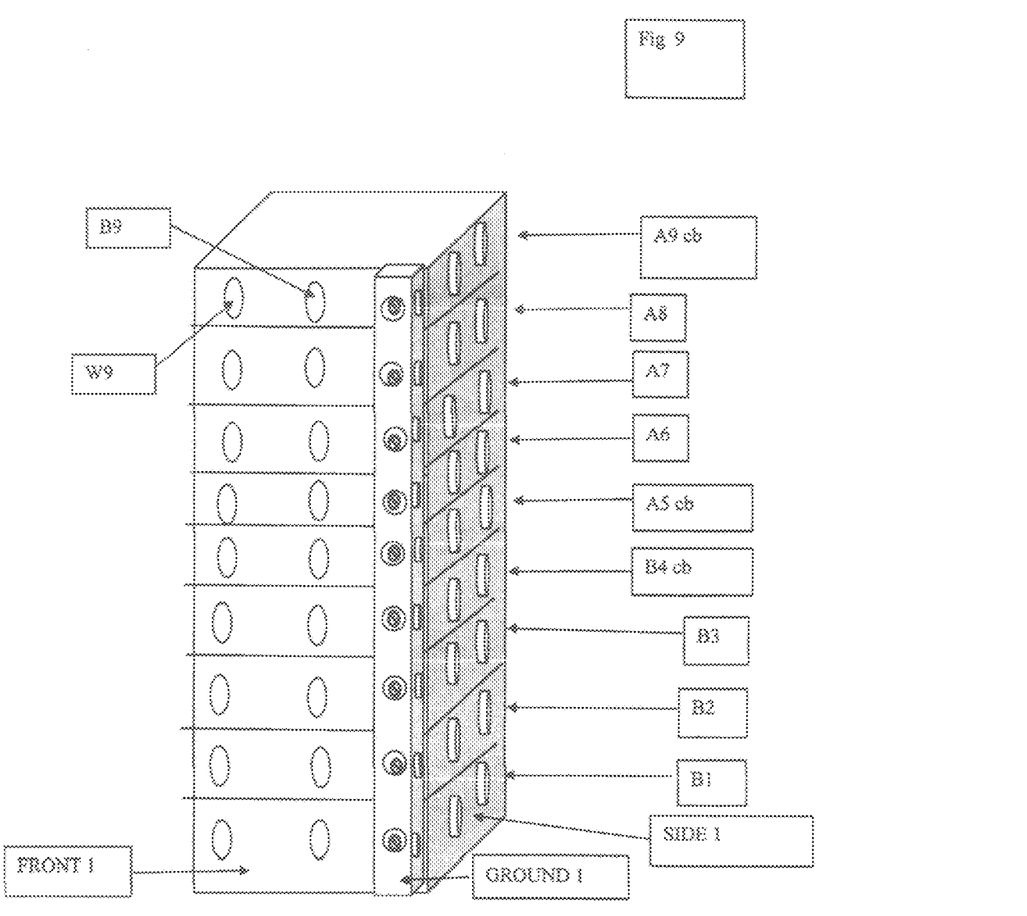
FIG. 9. FLOOR BY FLOOR DESCRIPTION OF THE HUB

(C) ⅜ inches of wire coating is removed from ends of Wire (D) Example of wire insertion points on the hub FIG. 9. FIG. 9 shows the different levels or floors of the hub. It shows where The black, white and ground wires go. It shows where the incoming power lines are attached. It shows how power is sent to the perpendicular side of the hub.

The Knee Save Modulator Universal Electrical Box's hub is made of a non-conductive material in the shape of a block. This block or hub has electrical conductors in it. These conductors move power from the source (wires) on the side of the hub, to the front or perpendicular side of the hub. One design can handle nine electrical lines. The following is what that hub would look like. The side view of the hub would look like 9 floors in a building, FIG. 9. Each floor can accept three wires. It is called a two-wire line. The ground wire is not counted. These wires would be a black wire, a neutral wire and a ground wire. Wires on the ninth floor (A9 cb) are power, neutral, and ground wires, which supply power to the hub for switches, with its own circuit breaker in the electrical panel. Wires on the $8^{th}$ floor (A8), the $7^{th}$ floor (A7) and the $6^{th}$ floor (A6) are for #14 wires. The $5^{th}$ floor (A5 cb) wire is also a #14 wire but it accepts power from the source, a breaker in the service panel. The $1^{st}$ floor (B1), $2^{nd}$, floor (B2) and $3^{rd}$ floor (B3) is for the #12 wire. The $4^{th}$ floor (B4 cb) is also for the #12 wire, but it accepts power from the source, a breaker in the service panel. Both the black and neutral (white) wire is inserted into the hub. The ground wire gets inserted into a ground bar (GROUND 1) where a ground screw seats and keeps the wire in place.

The set screws, in the perpendicular or front side, seats and keeps the black and white wires, from the side of the hub, in place.

The perpendicular side would look like two columns of 9 vertical holes. The left column of 9 would be the white wire prong connectors (W9). The next column of 9 would be the black wire prong connectors (B9). The other holes would be part of the ground strip with the 9 ground screws. This perpendicular side is where an electrical component or termination device would get plugged into.

One important difference to note, is that some prior art, needs THREE switches or THREE receptacles to transfer power to three outgoing lines. By comparison, the present invention, only needs one termination device.

Another difference is that the present invention, can light up to FOUR different lights, in FOUR different locations or rooms using one switch and lines, A8, A7, A6, and A5, where line A5 would not be hooked up to a breaker in the service panel.

A major difference between both the parent and this application compared to prior art, is the fact that NO electrical connections are made, between different independent lines (FIG. 9, A9-A5 & B4-B1), inside the hub, with the exception of the ground wires. All ground wires from all lines get connected to each other inside or on the hub. The hub's set screws hold the black and white wires in place, without making an electrical connection, unlike prior art.

In the parent application, lines that entered on the side of the hub (A9-A5 & B4-B1) contained a solid wire connection with the prong connectors on the perpendular side. The electrical energy would automatically go to the perpendular side connectors from the side connectors. The wires used a "push in" wire connection system.

This application changes that,

It provides set screws midway, within the block. IF the set screws are not seated, with a conductive set screws, no current can pass thru to the perpendicular side connectors, therefore, the lines would all be, held there, but dead ended. The set screws provide many advantages over all prior art, including the parent application.

Some advantages include:

This application allows all lines to be secured to the hub, until line activations is required, to any and all lines.

Any line can be electrically and/or physically disconnected in the hub, however, there is no need to physically move the wire. The parent application requires you to change the termination device or physically move the wire. This application allows you to unscrew the set screw which disconnects the line. If you want a seated screw to continue to hold the wire in place, without making any electrical connections, simply replace the set screw with a rubber tip set screw (91). That line will be disconnected, yet it will be held in place.

Should a set screw become loose, that Hot line cannot cause a short or a fire. The neutral and ground wires are still attached, keeping the hot line safely in the non-combustible hub, where the hot wire would be loose in the wall.

There's no need to turn off the entire circuit to work on a portion of a line, simply unseat a set screw for that line, or remove the termination device, which will cut off power to anything else on that line.

If there is a line not working, you can simply use a tester on the ground bar and a set screw to check if power is on each line, no disassembly of wire nuts is necessary.

A quick visual inspection of the hub will tell you if someone else already disconnected a line, by looking for a (red) rubber tipped set screw.

This new application allows you to use the same termination device, and not need to take the hub out of the junction box, to disconnect or activate a line.

Please look at FIG. 9 of the present invention. IF you had a switch controlling four outgoing lines, (A8, A7, A6, and (A5 no circuit breaker) and you wanted to disconnect one or more lines, you could. Put in a plastic set screw. The switch would still be working for the remaining lines.

The necessity for electricians to go on their knees to install each receptacle on a daily basis, causes many health issues. Some have to specialize in other electrical areas or leave the electrical field. Installing receptacles without getting down on your knees solves half the problem. You have to be able to service the receptacle without getting down on your knees. This applications, using the set screws, solves both problems, prior art require a person to squat or go on their knees.

The following explains how this application applies to the installation process of the receptacle.

This is what is would look like installing the entire device into a junction box:
1) Attach a junction box (FIG. 6, S22a) to a wall stud.
2) Use FIG. 8 to prepare the wires for insertion into the hub.
3) Attach all wire to hub (FIG. 8, D). Ground wires to the ground strip (FIG. 8, H).
Black wires to center column (FIG. 8, I), and the white wires to the right column (FIG. 8, J).
A Red wire would get attached with the black wires. Once, each set of wires inside the hub, tighten the set screws.
4) Pull out the side covers (FIG. 6, S22b) of the junction box (FIG. 6, S22a) (which is only one of the three options for openings in a junction box).
5) Slide the Hub in the side opening (toward the rear) using the Hub track guild (FIG. 6, R2) and the flange on the Hub (FIG. 2, #90). Slide the cover (S22b) back into the junction box (S22a).
6) Push in a termination device (FIG. 5), by lining up the prongs (86). Use on of the following methods to attach the termination device to the Hub:
  A) Push in the two plastic screws (FIG. 5, R5) into the top and bottom of the termination device flange (FIG. 5, R6) and into the junction box screw holes (R3). The slit thru the center of the screws, allows you to push the screws all the way in. The sides of the screws will snap into the screw threaded walls, locking it in place. The screw (R5) is removable, if desired, by simply turning the screw counter clockwise. These screws adjust the termination device to the wallboard surface.
  B) An alternative method is to tighten the adjustable screw (R4) to lock the termination device to the Hub. The termination device does not have to be up against the Hub. The prongs must go into the Hub without leaving a large space.
Utilizing the side opening, once the side cover (S22b) has been pulled out, the combination of the Hub Track guild (R2) and the Flange on the Hub (#90), make the entire unit depth-adjustable for a flush mount with the wallboard. Since the prongs go from the termination device to the hub or from the front to the back, a good electrical connection is possible. However, should there be too much space between the termination device and the hub, the design requires, for safety reasons, another adjustment between the guild and the flange be made. The adjustment can be done before or after the wallboard is installed.
While it is less likely that you would use both the #12 and #14 wires at the same time, you can. This model has several power sources, each with its own circuit breaker. This design allows you to use the same hub for either or both amperages, at the same time. This design and system allows you to have nine lines, and three circuit breakers from the service panel, on three lines.
An electrical component, such as a receptacle, is made with prongs sticking out of the back. If you were to use a 20-amp receptacle, it would have a specific alignment of prongs to fit into the #12 wire connector in the hub. If a #12 wire were installed with power, the receptacle would have power. In this example, if you plug in a 15 amp receptacle, the prongs would not engage the correct energized conductor, therefore no power to the receptacle.
As explained earlier, the floors of the "building" FIG. 9, B1, B2, B3, B4cb are for the 20 amp #12 electrical wire. Floors A5-A9cb are for the 15-amp, #14 electrical wire.
The prongs on a #14 wire, 15-amp termination device, would have to be in the top half of the termination device, to line up with the floors (A5-A9cb) of the building.

Likewise, a 20 amp, #12 wire termination device, would have its prongs at the lower half of the termination device, to match up with the floors (B1-B4cb).
Therefore, if the termination device has prongs that do not match up with the same amperage "floors" it will not work.
This, for a lack of a better term, idiot proofs the installation of the same amperage termination device with the same amperage wiring.
A receptacle or electrical component does not block the view of any wires at any time. This allows an electrical inspector to see the grounding connections while all the other wires are connected. There is no need for the electricians to rough wire, leave, then go back and install the receptacles, and/or switches. The receptacles and switches can be installed in the roughing process. All wires black, neutral, and ground are easily viewed, while a component is installed and operating.
Receptacles and switches are simply unplugged and plugged in. There is no need to have someone with electrical expertise to come in to change them. If you want to disconnect a line, you can. You can change the electrical component or un-seat the set screw. If you do not want to depend on the set screws that hold the neutral and ground wires in to secure the cable, simply replace the metal set screw with a rubber tip (non-conductive) set secrew (#91, FIG. 7).
If you want to change the receptacle, just unplug the old one & plug in the new one. There is no need to shut the power off.
If you want to add a line, you can, providing you haven't used all the slots.
In accordance with one embodiment, using the method of vertically stacking the wires coming into the box, protected by separation walls (S17), gives the viewer many pieces of information in one look, with or without a switch or receptacle installed and operating.
1) You can see how many lines are going into the box
2) All ground wires are visibly attached to the ground bar/strip.
3) Any three-wire cables are distinguishable (one of each: a black, a red, a white and a ground wire). Ground wires don't get counted.
4) Identifiable power lines (helpful when there is more than one power line entering the box) Floors (A9cb) if you are using a switch, (A5cb) for a 15 amp line, and (B4cb) for a 20 amp line)
5) The ability to verify the size of wire going into the correct conductor by looking at the ground wire at its connection point.
6) The ability to add or disconnect a line without separating the other lines
7) All the above can be seen while a receptacle/switch is installed.
As for the apparatus, it provides:
1) Easy access to all lines
2) Prevents wires from accidentally touching each other (By using the separation walls—
S17) unlike prior art, who just have openings.
3) No need of pigtails or wire nuts
4) Provides no exposed ENERGIZED wire, screw heads, set screws, or wire connectors, except for the ground strip. Prior art, has electrically charged connectors and set screws.
5) Enables anyone, to remove and install a new receptacle, or an electrical component without turning off the power
6) Since the circuit can be energized before the interior walls are covered, any wiring problems can be corrected easily. After the circuits are checked out, and if the inspector requires the typical rough inspection standards, the switches and the receptacles can be unplugged, and the power shut off. This process makes it possible to return to a typical rough inspection status within minutes.

7) The wires in the hub itself, make no electrical connections with other lines, (except for the ground wires), they simply hold the wires in place.

The unique prong "insertion or encasing" of the set screws (see FIGS. 1 & 3) stops the current or allows the current to move onto another line.

8) The block or hub prevents the receptacle and switch, with the wrong amperage rating, from being energized if it were installed.

A) Some prior art, boasts not having a hub.

B) The 15-amp and the 20-amp termination devices are the same size. There is nothing to stop someone from putting a twenty amp termination device into a MOSS 15 amp junction box.

9) Versatility of the block design makes it adaptable to all sizes of wire at time of manufacture 10) One design, can be made to handle up to nine lines of any size wire that is desired 11) Electrical current can be re-directed without changing or moving the wires. Use conductive set screws to send power, and non-conductive set screws to keep power there.

Please look at FIG. 9 for a better understanding of what is meant by "re-directed".

Assume conductive set screws are seated for the lines listed below.

1) If a receptacle has prongs at level A5*cb*, A6, and A8, it will re-direct power from A5*cb* to A6 & A8, while powering up the receptacle.

2) If a receptacle has prongs at level A5*cb*, and A7, it will re-direct power from A5*cb* to A7.

3) If a receptacle has prongs at level A5*cb*, and A6, and A7 it will re-direct power from A5*cb* to A6, and A7.

4) If a receptacle has prongs at level A5*cb* only, it will power up only the receptacle and not re-direct power anywhere.

When prior art, plugs in a device, they activate that device and transfer power to just one line. They have no means of sending power to other lines. Re-direct here means choice of lines. Prior art can't send power to multiple places at the same time, or pick a destination, the present invention can. Prior art also can'5 activate that one device, and not transfer power to another line. Prior art have no choices, it can only transfer from one place to another.

12) No power in a line? No need to touch wires. Put a tester on the ground bar and one of the set screws on the perpendicular side.

13) No polarity issues due to the visibility of all wires being installed correctly.

This new hub design does not limit its use to receptacle/switches. Things like lights, fans, and even radios, with their own on/off switch, can be used without the need of an electrical cord.

These conductors can be made to be any diameter when the hub is manufactured to accommodate different needs.

This device can be modified to be used in different countries.

REFERENCE NUMERALS

A9*cb*. Black, White, & Ground wires for powering a switch (15 amp #14 wire)
A8. 8th floor, outgoing wires . . . (15 amp #14 wire)
A7. 7$^{th}$ floor, outgoing wires . . . (15 amp #14 wire)
A6. 6$^{th}$ floor, outgoing wires . . . (15 amp #14 wire)
A5*cb* 5$^{th}$ floor outgoing wires, . . . (15 amp #14 wire)
    OR incoming power line from breaker panel box
B4*cb*. Incoming power line from breaker panel box (20 amp #12 wire)
B3 Outgoing wires . . . (20 amp #12 wire)
B2 Outgoing wires . . . (20 amp #12 wire)
B1 Outgoing wires . . . (20 amp #12 wire)
SIDE 1 Side of HUB
FRONT 1 Front or perpendicular side
GROUND 1 Ground bar with a ground screw at each "floor"
B9 Vertical row of Prong connectors for black power lines
W9 Vertical row of Prone connectors for white neutral lines

REFERENCE NUMERALS

No.
81. Set screw (with hole in center for prongs)
82. Wire channels with the set screw inserted
83. Open wire channel
84. Tip of wire with coating removed
85. Coated electrical wire
86. Termination device insertable prong
87. Termination device, receptacle
88. Alternate set screw
89. Termination device, alternate tube prong
90. Hub flange, (top and bottom)
91. Rubber tipped non-conductive set screw (Head red in color)
R1. Hub
R2. Hub track guild
R3. Junction box fastening screw hole
R4. Adjustable depth precision screw
R5. Split screw
R6. Termination device flange
R7. Termination device (using alternate tub prong 89)

REFERENCE NUMBERS

No.
S17. Separation walls
S22a. Enclosure
S22b. Removable side cover
S29. Side cover tracks
A. Sheathed cable
B. Partially removed cable sheathing, wires cut to correct lengths E, F, & G
C. wire coating removed from wire tips exposing metal
D. Wires entering hub
H. Ground Bar or strip
I. Black wire column
J. White wire column

What is claimed is:

1. An assembly comprising:
   a. junction box;
   b. dielectric body having a front surface and a side surface whereby connectors on said side surface do not electrically connect with said connectors on said front surface until set screws are engage,
   wherein said set screws connect and disconnect lines, thereby making a plurality of conductive elements that extend through said dielectric body from said side connectors to said front connectors and a termination device;
   wherein said dielectric body can redirect current without physically disconnecting or moving wires to the inserted said set screws;

wherein said set screws of the dielectric body has a hole in the center to mate with the terminating device insertible prong;

wherein said dielectric body has specific wire gauge diameter holes for power line wire gauge locations for easy identifications, thereby powering up specific wire gauge components with the proper amperage; and wherein installation of different amperage lines can be installed and energized at the same time, thereby non-compatible amperage terminations devices will not work.

2. The assembly according to claim 1, wherein said dielectric body does not need the power to be shut off to change said termination devices.

3. The assembly according to claim 1, wherein said dielectric body can be energized while the walls are open for any troubleshooting.

4. The assembly according to claim 1, wherein said dielectric body is designed with wire separation walls to prevent accidental touching of wires that are loose from an improper installation.

5. The assembly according to claim 1, wherein said dielectric body has no energized parts exposed.

6. The assembly according to claim 1, wherein said dielectric body shows the connection points of three wire cables.

7. The assembly according to claim 1, wherein said dielectric body prevents incorrect polarity due visibility of stacked like colored lines.

8. An assembly comprising:

a. junction box;

b. dielectric body having a front surface and a side surface whereby connectors on said side surface do not electrically connect with said connectors on said front surface until set screws are engage, wherein said set screws connect and disconnect lines, thereby making a plurality of conductive elements that extend through said dielectric body from said side connectors to said front connectors and a termination device, wherein the terminating device is comprised of a tube prong to mate with the said set screws of the dielectric body;

wherein said dielectric body can redirect current without physically disconnecting or moving wires to the inserted said set screws;

wherein said dielectric body has specific wire gauge diameter holes for power line wire gauge locations for easy identifications, thereby powering up specific wire gauge components with the proper amperage; and wherein installation of different amperage lines can be installed and energized at the same time, thereby non-compatible amperage terminations devices will not work.

* * * * *